United States Patent [19]

Chen et al.

[11] Patent Number: 4,562,508
[45] Date of Patent: Dec. 31, 1985

[54] REGULATOR FAULT PROTECTION CIRCUIT

[75] Inventors: John Chen, Taichung; Chin Huang, Taoyuan, both of Taiwan; Nancy D. Graves, Indianapolis; James E. Hicks, New Palestine, both of Ind.

[73] Assignee: RCA Corporation, Princeton, N.J.

[21] Appl. No.: 609,414

[22] Filed: May 10, 1984

[51] Int. Cl.⁴ .............................................. H02H 3/20
[52] U.S. Cl. .................................... 361/91; 315/411; 358/243
[58] Field of Search ...................... 361/18, 86, 88, 91; 315/411; 358/243

[56] References Cited

U.S. PATENT DOCUMENTS

| | | | |
|---|---|---|---|
| 3,858,084 | 12/1974 | Manners | 315/387 |
| 4,042,859 | 8/1977 | Kashiwagi | 315/411 |
| 4,074,323 | 2/1978 | Griffey | 358/243 |
| 4,115,814 | 9/1978 | Kosaka et al. | 361/91 X |
| 4,145,639 | 3/1979 | Willis | 315/411 |
| 4,213,166 | 7/1980 | Watanabe | 361/86 |
| 4,236,187 | 11/1980 | Mochiyuki et al. | 361/91 X |

Primary Examiner—Harry E. Moose, Jr.
Attorney, Agent, or Firm—Paul J. Rasmussen; Joseph Laks; Scott J. Stevens

[57] ABSTRACT

A protection circuit for a video display apparatus causes shutdown to occur at substantially the same high voltage level for all fault conditions. The video display apparatus incorporates an SCR regulator and a high voltage transformer tuned to the third harmonic. To counter the effect of shutdown to occur at a higher voltage level for a shorted SCR fault than for other faults, the SCR anode control pulse is processed to provide a signal having different voltage levels for normal SCR operation and shorted SCR operation. The voltage level which occurs during a shorted SCR condition is selected to cause shutdown of the video display apparatus at substantially the same high voltage level as that for other fault conditions.

2 Claims, 6 Drawing Figures

REGULATOR FAULT PROTECTION CIRCUIT

This invention relates to protection circuits for video display apparatus and, in particular, to protection circuits for video display apparatus incorporating SCR voltage regulators.

Television receivers and other video display apparatus incorporate circuits which generate high voltage levels necessary to accelerate electron beams from an electron gun assembly to the phosphor display screen of a kinescope or picture tube. Excessive high voltage levels may cause unsafe amounts of X-radiation to be emitted by the video display apparatus. It is important, therefore, to provide protection circuits which reduce the high voltage level or disable the video display apparatus when excessive high voltage is sensed, or when a condition is present that may lead to the generation of excessive high voltage.

The high voltage level is often sensed by detecting the magnitude of a voltage produced across a secondary winding on the high voltage transformer. Since this sensed voltage is produced in response to the horizontal retrace pulses applied across the transformer primary winding, the magnitude of the sensed voltage is related to the magnitude of the high voltage, which is also derived from the horizontal retrace pulses. This relationship is determined through measurement during transformer design and testing to establish the appropriate sensing voltage trip level for different electron beam currents. Shutdown circuits may, for example, disable the video display apparatus whenever the magnitude of the sensed voltage exceeds the established trip level, representative of excessive high voltage.

The video display apparatus also incorporates a regulator circuit for providing a constant regulated supply voltage that is used to power load circuits of the video display apparatus, such as audio circuits or deflection circuits.

A common regulator circuit incorporates a switching device, such as a silicon controlled rectifier (SCR), that is connected to a source of unregulated voltage derived from the ac line supply. Conduction of the SCR causes a regulated supply capacitor to charge. The conduction time of the SCR is controlled each horizontal deflection cycle in order to maintain a regulated voltage across the capacitor.

The regulator may experience a fault condition in which the SCR become short circuited anode to cathode. This increases the transformer primary voltage which in turn increases the high voltage level. Shorting of the regulator SCR also causes the inductance associated with the SCR to be shunted across the regulator winding of the high voltage transformer, which changes the inductance of the primary winding circuit. For a high voltage transformer tuned to the third harmonic, this change in the primary winding circuit inductance may distort the primary winding pulse which therefore distorts the high voltage winding pulse. Distortion of the high voltage winding pulse may change the determined relationship or ratio between the high voltage level and the sense level so that the high voltage level is actually higher than would be indicated by the sense voltage. This causes the protection circuit to trip at a higher voltage in response to a shorted regulator SCR fault than in response to other faults. This trip voltage difference may cause a level of high voltage to be generated which may exceed the cathode ray tube isoexposure curve without shutdown occurring.

The present invention is directed to a protection circuit which causes the video display apparatus to become inoperative at voltage levels that are substantially equal for both SCR faults and other faults.

In accordance with the present invention, a protection circuit for a video display apparatus comprises a source of unregulated voltage and a switching regulator incorporating an SCR coupled to the unregulated voltage source for producing a regulated voltage level. The SCR is subject to failure by becoming shorted. A transformer produces a control signal, having a particular characteristic, which is applied to the SCR and controls an aspect of its operation. Shorting of the SCR causes the control signal characteristic to be absent.

A shutdown circuit is responsive to a sensing signal and causes the video display apparatus to become inoperative when the sensing signal exceeds a predetermined level. The shutdown circuit is coupled to the SCR and is responsive to the presence of the control signal characteristic for maintaining normal operation of the video display apparatus when the sensing signal is below the predetermined level. The shutdown circuit is responsive to the absence of the control signal characteristic for causing the video display apparatus to become inoperative in response to the sensing signal even when the sensing signal is below the predetermined level.

In the accompanying drawing, FIG. 1 is a block and schematic diagram of a portion of a video display apparatus including a voltage regulator and a high voltage shutdown circuit;

Figure 1:
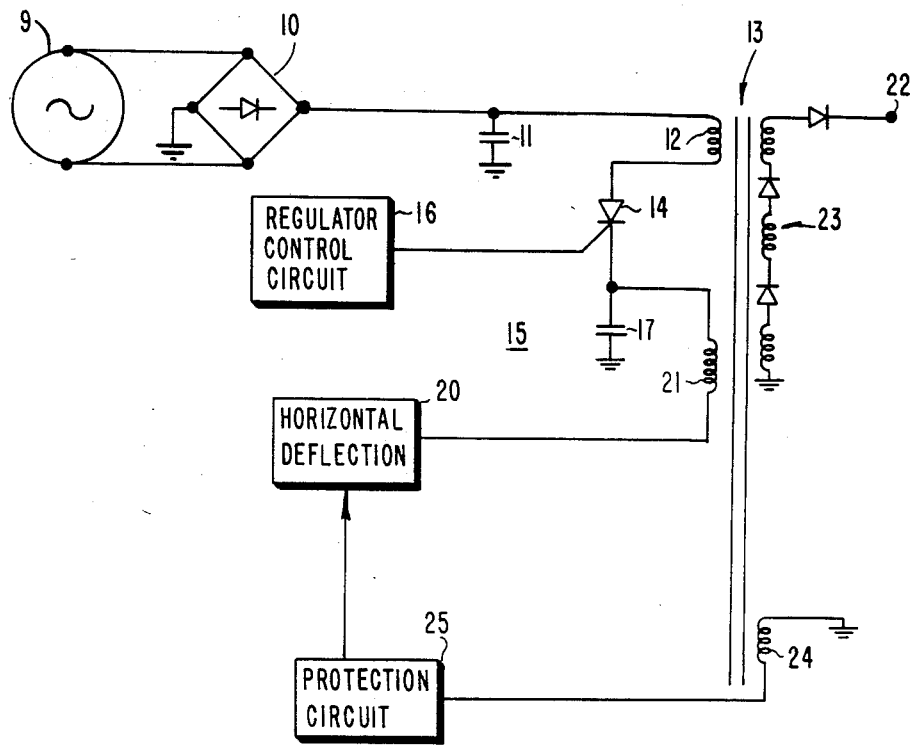
Figure 2:
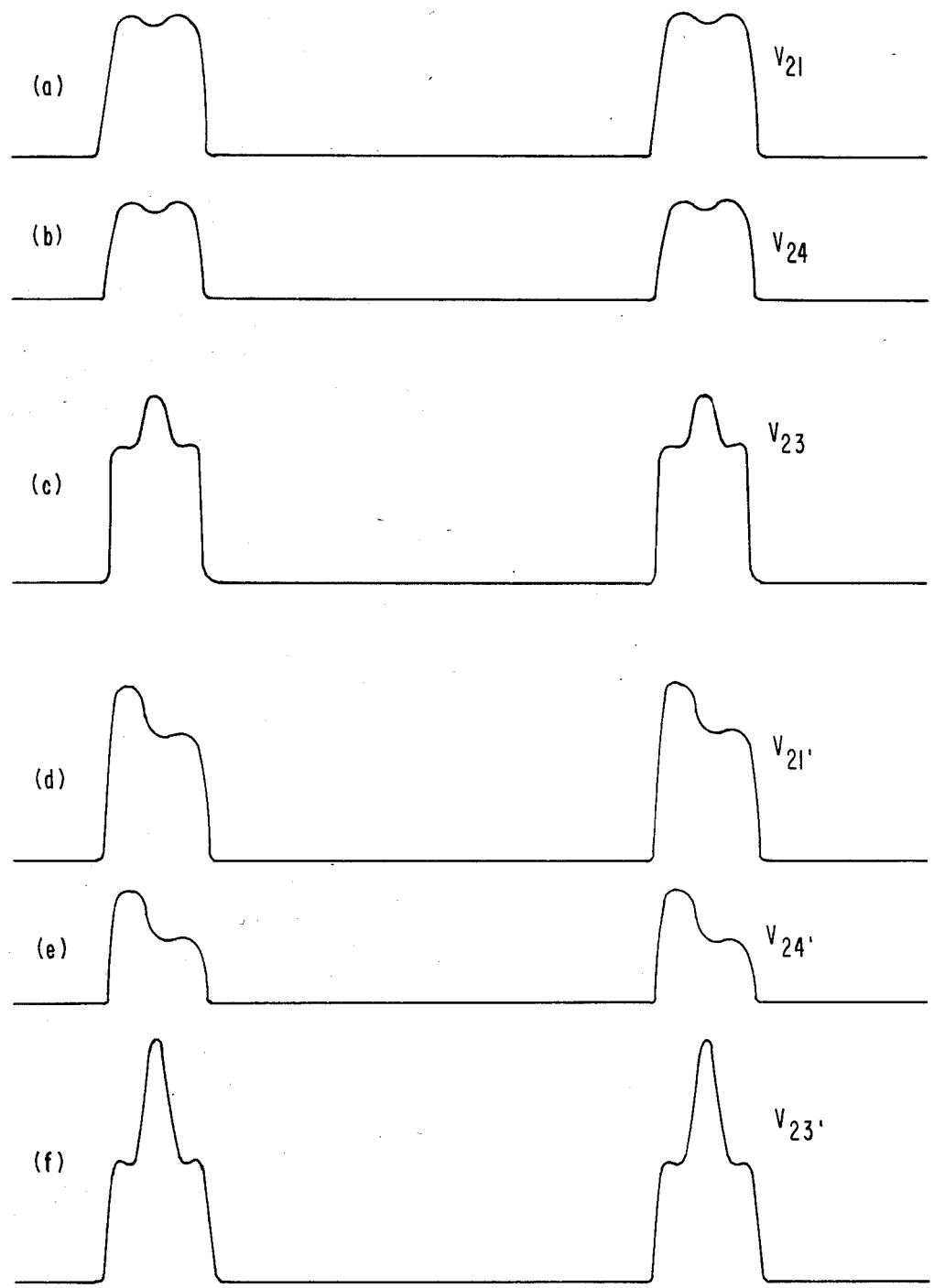
FIGS. 2 and 3 illustrate waveforms associated with the circuit of FIG. 1.

FIG. 1 illustrates a portion of a video display apparatus, such as a television receiver, in which a source of ac voltage 9 is rectified by a diode bridge 10 and filtered by a capacitor 11 to form a source of unregulated direct voltage which is applied via a regulator winding 12 of a transformer 13 to the anode of an SCR 14. SCR 14 forms part of a switched mode voltage regulator circuit 15, which also includes regulator control circuit 16 and capacitor 17. The conduction interval of SCR 14 is controlled by the regulator control circuit to maintain a regulated voltage level across capacitor 17 independent of line voltage variations. The regulated voltage is applied to horizontal deflection circuit 20 via a winding 21 of transformer 13. Transformer 13 is harmonically tuned, for example, to the third harmonic. Horizontal deflection circuit 20 produces horizontal retrace pulses $V_{21}$, shown in FIG. 2a, which generate pulses across high voltage winding 23 via transformer action. These tertiary pulses, $V_{23}$, shown in FIG. 2c, are rectified to produce a source of high voltage of the order of 20 kV at a terminal 22. Terminal 22 is connected to the high voltage or anode terminal of a kinescope (not shown).

The horizontal retrace pulses also generate sample pulses, $V_{24}$, across a sampling winding 24 of transformer 13, as shown in FIG. 2b. The amplitude of these sample pulses is representative of the high voltage level. Sampling winding 24 is coupled to a protection circuit 25 which senses the amplitude of the sample pulses. If the amplitude of the sample pulses exceeds a predetermined level, indicative of an excessive high voltage level, protection circuit 25 causes the video display apparatus to become disabled or inoperative. In FIG. 1, protection circuit 25 is shown illustratively as being coupled to horizontal deflection circuit 20. In the circuit of FIG. 1, therefore, protection circuit 25 would cause horizontal deflection circuit 20 to become disabled, which would terminate the horizontal retrace pulses and therefore reduce the high voltage level. Other disabling mechanisms are of course possible.

Figure 3:
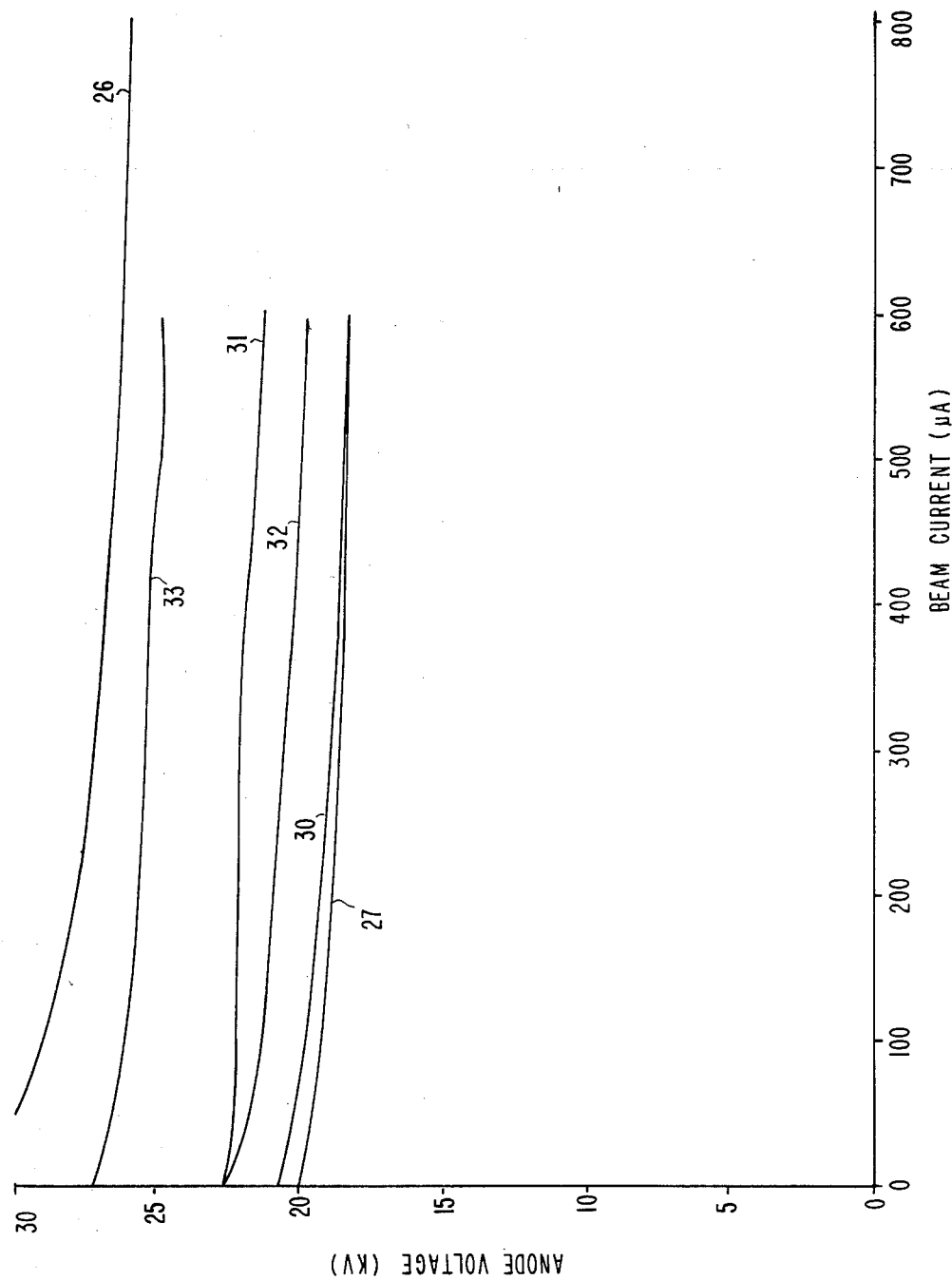

The third harmonic tuning of transformer 13 may cause protection circuit 25 to disable the video display apparatus at different levels of high voltage in response to different video display apparatus circuit faults. This is illustrated in FIG. 3, which shows various disabling or trip curves for different fault conditions. Curve 26, the isodose, or isoexposure curve, illustratively represents the maximum allowable high voltage level at given beam currents for a representative 9 V kinescope or cathode ray tube. Curve 27 represents normal high voltage levels for a video display apparatus operating without faults at normal ac line voltage. Curve 30 represents the high voltage trip level for most fault conditions, including an excessive regulated voltage level, for a video display apparatus having components selected to have their tolerances skewed to one extreme. Curve 31 represents the high voltage trip level for a circuit having components with their tolerances skewed to the other extreme. Curve 32 represents the high voltage trip level for a fault in which the switching regulator SCR shorts anode to cathode, with components skewed to one tolerance extreme. Curve 33 represents the high voltage trip level for a shorted SCR with components skewed to the other tolerance extreme.

It can be seen from FIG. 3 that it is difficult to adjust the high voltage trip levels so that a given video display apparatus will operate properly, yet be safely disabled in response to all fault conditions for all possible component tolerance combinations. It can be seen that trip curve 30 intersects the normal operating curve 27, resulting in nuisance trips during normal operating conditions. Adjusting the trip curve upwards to relieve the nuisance trip problem may cause curve 33 to exceed the isoexposure curve 26. It is obvious that the high voltage trip levels for a shorted SCR fault are significantly higher than the high voltage trip levels for other fault conditions. As stated previously, this is caused by the nature of the third harmonic tuning of transformer 13. Shorting of the regulator SCR 14 causes the regulated voltage level to rise which causes the pulse across winding 21 to become distorted as shown by pulse $V_{21'}$ in FIG. 2d. The sensing pulse $V_{24'}$, as shown in FIG. 2e, will also resemble the pulse $V_{21'}$. The tuning of transformer 13, however, will cause the high voltage generating tertiary pulse $V_{23'}$, as shown in FIG. 2f, to increase to a greater extent than the sensing pulse $V_{24'}$. The high voltage will therefore be at a higher level than would be expected for a given amplitude of sampling pulse $V_{24'}$. For different fault conditions, therefore, a given amplitude of sensing pulse $V_{24'}$ result in different high voltage levels.

Figure 4:
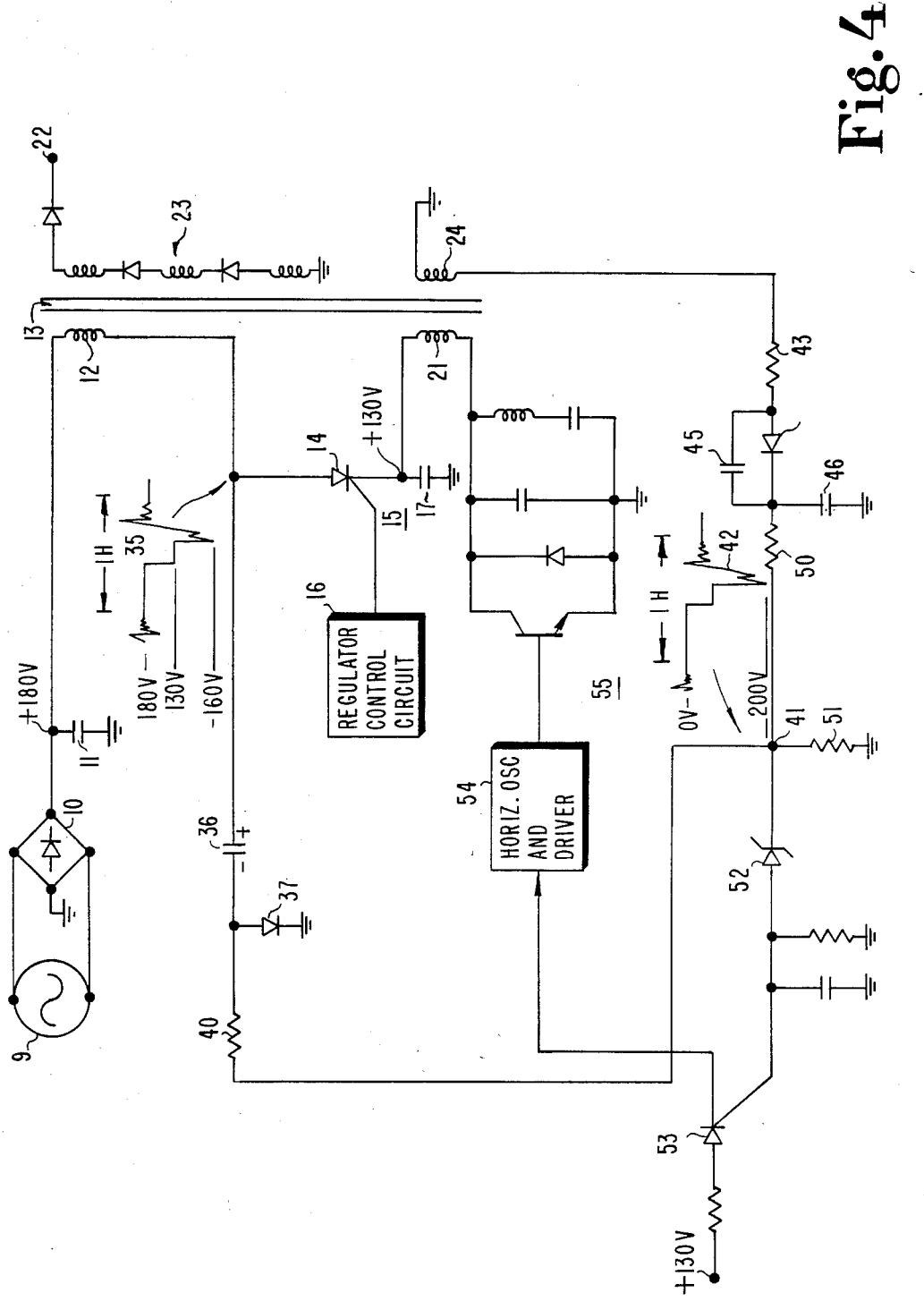
FIG. 4 is a schematic and block diagram of a portion of a video display apparatus incorporating a protection circuit in accordance with an aspect of the present invention.

In accordance with an aspect of the present invention, FIG. 4 illustrates a protection circuit that causes disabling of a video display apparatus at substantially the same high voltage level regardless of the type of fault condition. Circuit elements corresponding to those of FIG. 1 have corresponding numerical designations.

Commutating pulses that turn off SCR 14 appear across winding 12 via action of transformer 13 and are applied to the anode of SCR 14. During normal operation the commutating pulses 35, shown in FIG. 4, comprise a negative portion that acts to turn SCR 14 off. The commutating pulse is negatively clamped by capacitor 36 and diode 37 and applied via resistor 40 to a junction 41 as a negative-going pulse 42.

The sensing pulse generated across winding 24 is sensed by a peak detector comprising resistor 43, diode 44, capacitor 45 and capacitor 46. The peak detected magnitude of the sampling pulse is applied via a voltage divider comprising resistors 50 and 51 to junction 41. The values of resistors 50 and 51 are selected so that during fault conditions other than shorted regulator SCR, the voltage provided by the sensing pulse detector, when summed with the negative voltage provided by pulse 42, is sufficient to cause zener diode 52 to break down. Breakdown of zener diode 52 triggers SCR 53, which illustratively disables horizontal oscillator and driver circuit 54 of horizontal deflection circuit 55. The high voltage level at which zener diode 52 breaks down is selected to be above the level at which nuisance trips may occur.

Figure 5:
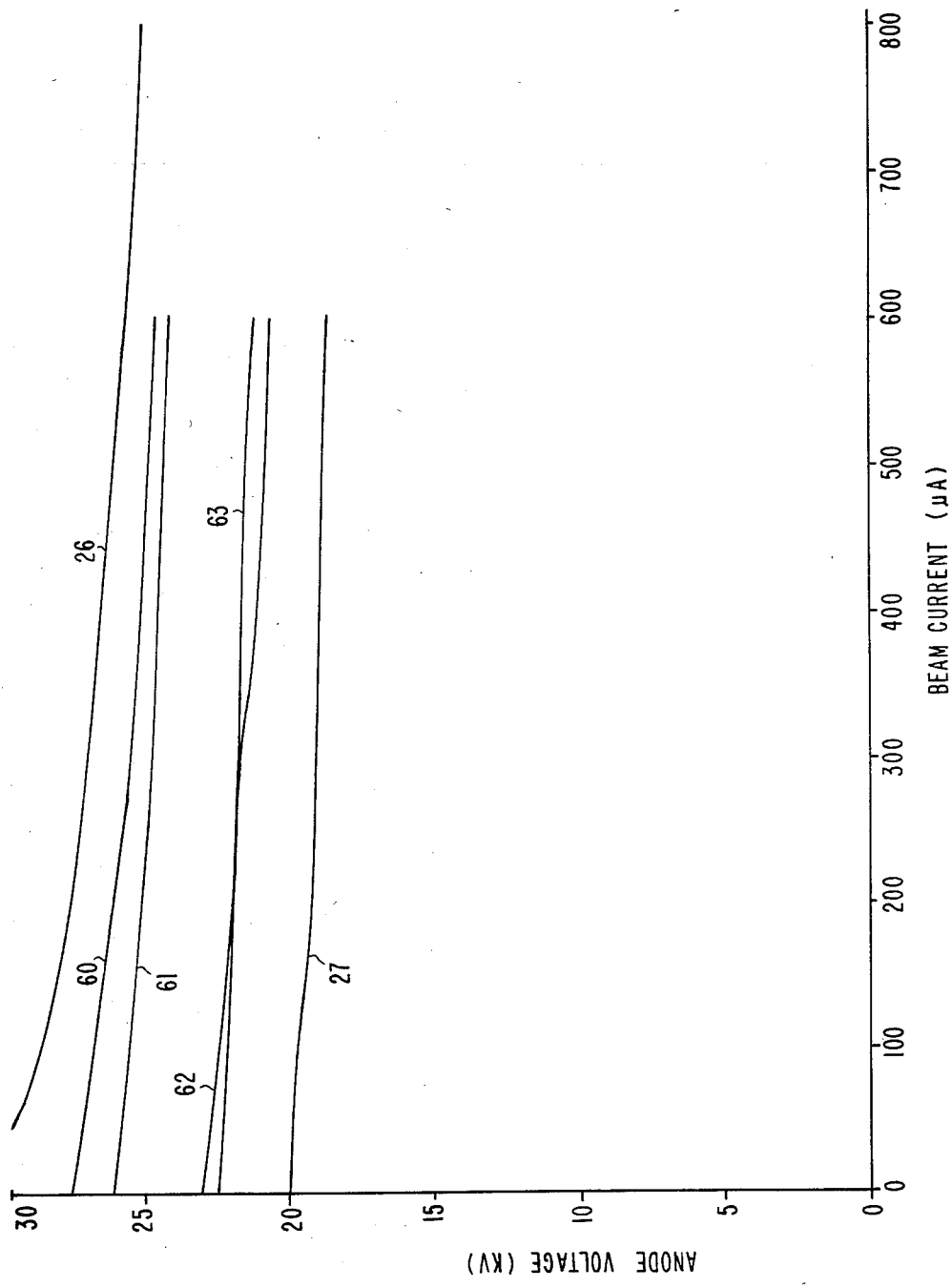
FIG. 5 illustrates waveforms associated with the circuit of FIG. 4.

When shorting of SCR 14 occurs, the anode of SCR 14 can no longer go negative and therefore, the negative portion of the commutating or control pulse will no longer have a negative-going portion. A negative voltage will no longer be applied to junction 41. The voltage level from the sensing pulse detector needed to break down zener diode 52 will therefore be lower for a shorted SCR fault than for other faults since the negative prebias applied to junction 41 is not present during a shorted SCR fault. The high voltage level at which the video display apparatus becomes disabled in response to a shorted SCR fault may therefore be substantially equal to the high voltage level at which disabling occurs in response to other faults. This is shown in FIG. 5 in which the maximum tolerance trip curves 60 and 61, representing a shorted SCR fault and other faults, respectively, are closely spaced, as are the minimum tolerance trip curves 62 and 63, for shorted SCR and other faults, respectively. It can be seen for a given video display apparatus, the high voltage level at which disabling occurs is substantially the same regardless of the type of fault condition.

Figure 6:
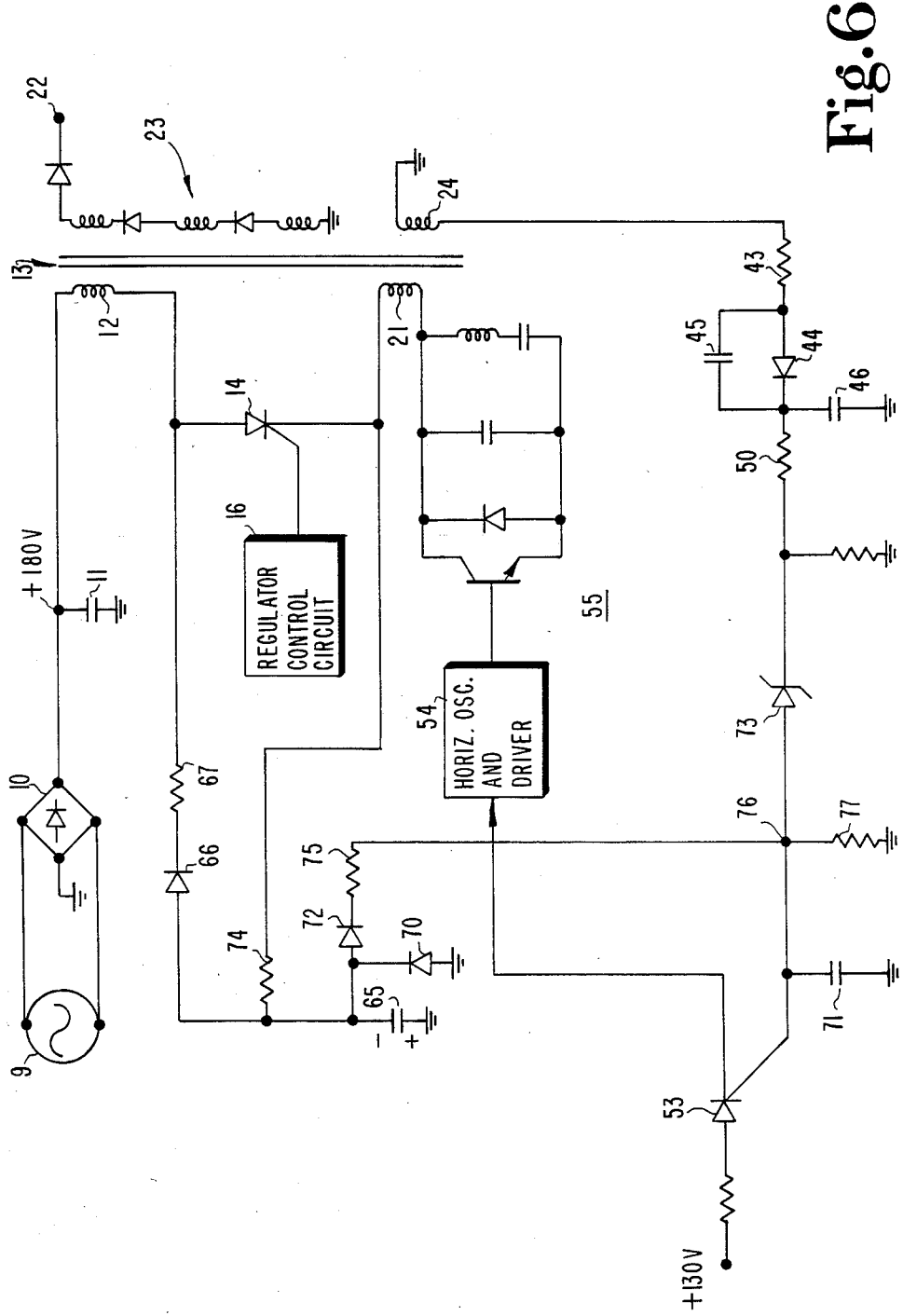
FIG. 6 is a schematic and block diagram of a portion of a video display apparatus incorporating a protection circuit in accordance with another aspect of the present invention.

In accordance with another aspect of the present invention. FIG. 6 illustrates a protection circuit similar to that shown in FIG. 4. During normal operation of regulator SCR 14, the negative portion of the commutating or control pulse at the anode of SCR 14 charges capacitor 65 via diode 66 and resistor 67. Diode 70 limits the charge on capacitor 65 to approximately −0.7 volts. The voltage across capacitor 71 is approximately zero volts, so that diode 72 is reverse biased. When a fault other than a shorted SCR occurs, the peak detected voltage from sensing winding 24 is sufficient to cause zener diode 73 to break down, thereby triggering shutdown SCR 53.

When a condition exists in which SCR 14 is shorted, the negative portion of the anode control pulse is not present and the anode will always be positive. This causes diode 66 to become reverse biased, allowing current to flow from the regulated voltage supply at the cathode of SCR 14 through resistor 74, diode 72, and resistor 75 to a junction 76. Resistors 75 and 77 are selected to allow the voltage at junction 76, which will be the voltage across capacitor 71, to trigger SCR 53 when SCR 14 becomes shorted. The high voltage level at which SCR 53 is triggered in response to a shorted regulator SCR may be selected, via the choice of values for resistors 75 and 77, to be substantially the same as the high voltage trip level for other video display apparatus faults.

What is claimed is:

1. A protection circuit for a video display apparatus, comprising:

a source of unregulated voltage;

switching regulator means incorporating an SCR coupled to said source of unregulated voltage for producing a regulated voltage level, said SCR subject to failure by becoming shorted;

transformer means producing a control signal applied to said SCR for controlling an aspect of the operation of said SCR, said control signal having a particular characteristic, said shorting of said SCR causing said characteristic to be absent;

video display apparatus shutdown means responsive to a sensing signal for causing said video display apparatus to become inoperative when said sensing signal exceeds a predetermined level, said shutdown means coupled to said SCR and responsive to the presence of said characteristic of said control signal for providing a first control voltage signal for maintaining normal operation of said video display apparatus when said sensing signal is below said predetermined level, said shutdown means responsive to the absence of said characteristic for providing a second control voltage signal for causing said video display apparatus to become inoperative even when said sensing signal is below said predetermined level.

2. A protection circuit for a video display apparatus, comprising:

a source of unregulated voltage;

switching regulator means incorporating an SCR coupled to said source of unregulated voltage for producing a regulated voltage level, said SCR subject to failure by becoming shorted;

transformer means producing a control signal applied to said SCR for controlling an aspect of the operation of said SCR, said control signal having a particular characteristic, said shorting of said SCR causing said characteristic to be absent;

video display apparatus shutdown means responsive to a sensing signal for causing said video display apparatus to become inoperative when said sensing signal exceeds a predetermined level, said shutdown means coupled to said SCR and responsive to the presence of said characteristic of said control signal for maintaining normal operation of said video display apparatus when said sensing signal is below said predetermined level, said shutdown means responsive to the absence of said characteristic for causing said video display apparatus to become inoperative in response to said sensing signal even when said sensing signal is below said predetermined level.

* * * * *